Oct. 2, 1934.  F. B. MILLINGTON  1,975,117
DIRIGIBLE HEADLIGHT
Filed Sept. 21, 1931   2 Sheets-Sheet 1
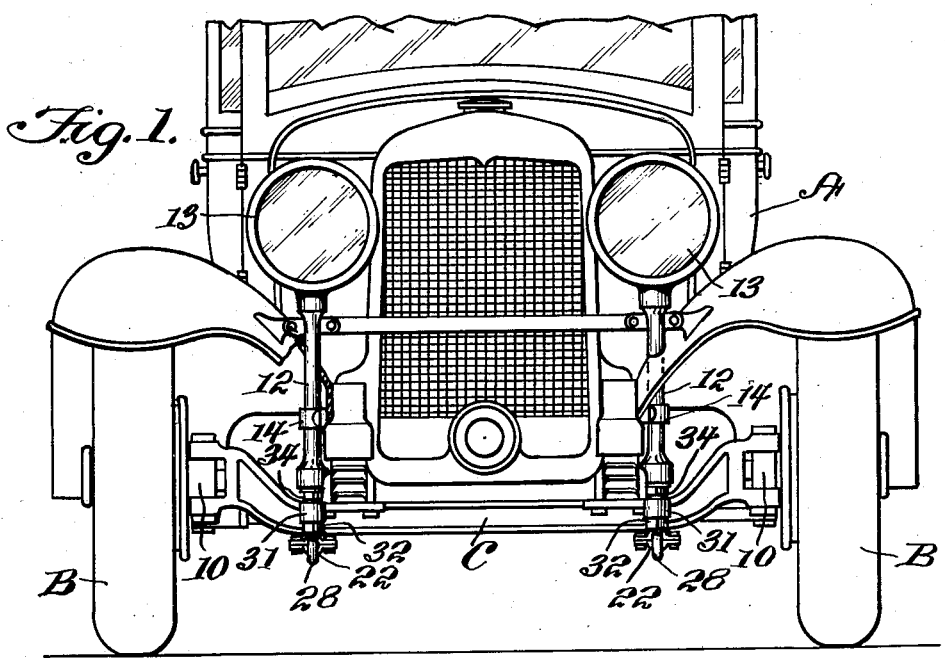
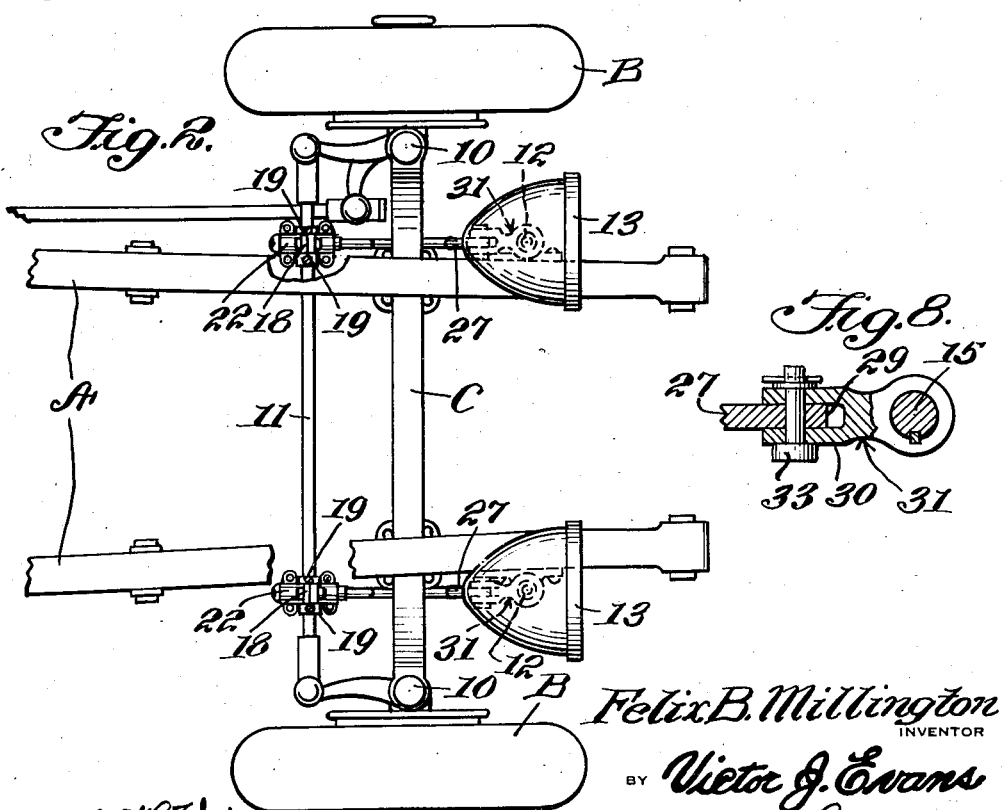
Felix B. Millington INVENTOR
BY Victor J. Evans and Co. ATTORNEY
WITNESS: J. T. L. Wright

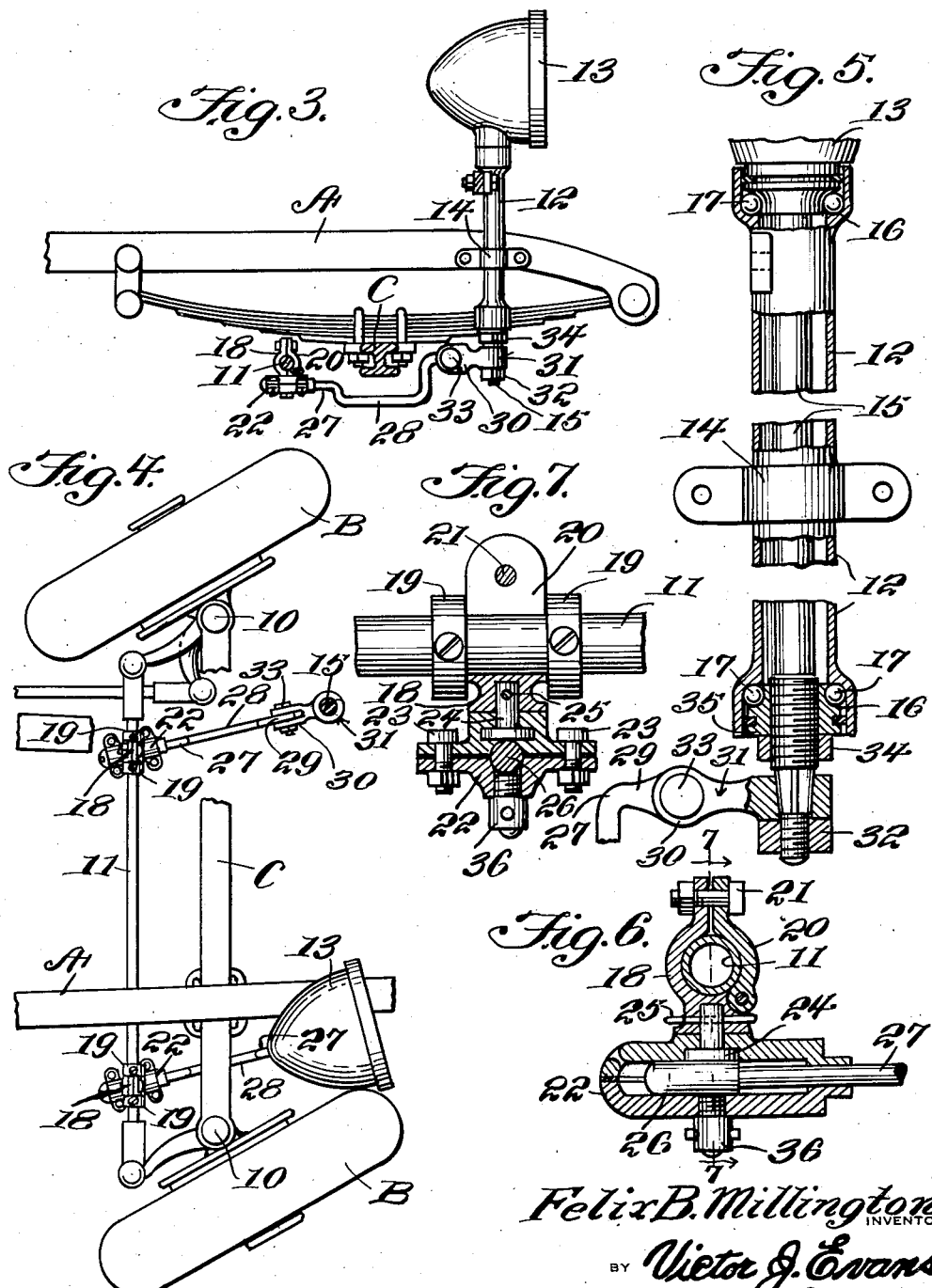

Patented Oct. 2, 1934

1,975,117

UNITED STATES PATENT OFFICE 1,975,117

DIRIGIBLE HEADLIGHT

Felix B. Millington, Maracaibo, Venezuela

Application September 21, 1931, Serial No. 564,096

1 Claim. (Cl. 240—62.72)

The invention relates to dirigible headlights and more especially to movable headlights for automobiles or the like.

The primary object of the invention is the provision of headlights of this character, wherein the showing of light upon the path of the moving vehicle is assured, especially when rounding curves or corners in the course of travel of such vehicle, so that at all times the operator can clearly see the course over which the vehicle is to travel, thereby assuring safety along a course deviating from a straight course.

Another object of the invention is the provision of headlights of this character, wherein the mounting thereof and the control for the movement of the same correspondingly to the turning of the wheels of the vehicle is novel in form so as not to interfere with the spring action of the vehicle when the wheels are traveling over irregular surfaces and also to assure the direction of the light from the headlights correspondingly to the direction of travel of the vehicle.

A further object of the invention is the provision of headlights of this character which are extremely simple in construction, thoroughly reliable and efficient in purpose, strong, durable, neat and attractive in appearance, positive of operation and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a fragmentary front elevation of a motor vehicle showing the headlights constructed in accordance with the invention applied thereto.

Figure 2 is a fragmentary plan view of the chassis of the vehicle showing in detail the headlights in accordance with the invention applied.

Figure 3 is a fragmentary vertical longitudinal sectional view thereof.

Figure 4 is a view similar to Figure 2 showing the front wheels of the vehicle turned at an angle and the headlights correspondingly adjusted, one of the headlights being removed and also the front axle of the vehicle broken away for the sake of clearness in detail.

Figure 5 is a vertical longitudinal sectional view through one of the steering posts for the headlights.

Figure 6 is a fragmentary vertical transverse sectional view through one of the connections for one of the lamps.

Figure 7 is a sectional view on the line 7—7 of Figure 6 looking in the direction of the arrows.

Figure 8 is a detail view partly in section of one of the hinge couplings.

Similar reference characters indicate corresponding parts throughout the several views in the drawings.

Referring to the drawings in detail, A designates a portion of a motor vehicle which is of standard construction having between its front wheels B the front stationary axle C and turning knuckles 10 associated therewith, these knuckles being joined through the medium of a cross tie rod 11 as usual and the wheels B are steered in the usual well known manner.

Arranged on opposite sides of the chassis of the automobile A are vertical tubular posts 12 for supporting head lamps or lights 13, these being of any approved or conventional form, each post 12 being supported in a bracket 14 suitably fixed to the side sill of the chassis of the automobile A at the front thereof. Each lamp 13 which constitutes the headlight is provided with a turning stem or shank 15 which extends downwardly through the post 12, the stem or shank 15 and the post 12 being provided with suitable ball raceways 16 both at the top and bottom of said post for accommodating anti-friction balls 17 therein so that the said lamps 13 will turn freely in a manner presently described.

Mounted on the cross tie rod 11 between the knuckles for the wheels B of the automobile A at desirable points are hangers in the form of opening and closing clamps 18, each being mounted between retaining collars 19 adjustably secured on said rod 11 at opposite sides of the clamps. Each clamp has a hinged opening jaw 20, the same being held secure by a nut carrying bolt 21 and in closing position for the clamps 18 to loosely embrace said rod 11. Swiveled or otherwise pivotally depending from each clamp 18 is a two-part piston cylinder or housing 22, the parts being detachably fastened together through the medium of nut carrying bolts 23 and this cylinder or housing is held pivoted to the clamp 18 through the medium of a headed pin 24, the latter being removably secured in the clamp through the retaining pin 25 passed transversely through the clamp 18 and said pin 24. Working within the cylinder or housing 22 is a piston 26 having a forwardly directed rod extension 27, the latter being provided with a bight 28 intermediate thereof to clear the axle 11 as this rod is directed forwardly beneath the same and terminates at its forward end in an eye 29, the latter swingingly pivoted in a forked bearing 30 formed on a coupling 31 which is splined or keyed to the lower end of the stem or shank 15 and removably held thereon by a binding nut 32 threaded on the lower end of said stem or shank. Thus it will be seen that the lamps 13 in their connection with the cross tie rod 11 as hereinbefore described will be caused to turn on the turning of the wheel B of the automobile A so as to direct the light from said lamp in the path of travel of the automobile and forwardly thereof, whether said automobile is traveling in a straight path or about a curve or corner and in this manner the light from the lamps will be in advance of the automobile and in the path of forward travel of the same.

The cylinder or housing 22 with the piston 26 slidably fitted therein compensates for the rise and fall of the wheels B on the roadbed due to irregularities of road surface and thus avoid interference with the springs in their action for taking up shocks and jars incident to the travel of the automobile; the forward end of each rod extension 28 being pivoted at 33 to the coupling 31 and in this way the arcuate movement of the rod extension 28 is permitted, while the clamp 18 is loose to swing on the rod 11 as the chassis of the automobile A swings under road irregularities.

The stem or shank 15 of each lamp 13 is held in the stand or post 12 through the medium of a nut 34 engaged on the lower end of said stem or shank and working against the lowermost cone for the bearing ball 17 within said post.

The cylinder or housing 22 in its underside is provided with an oiling nipple 36 so that oil can be introduced therein for the lubrication of the piston 26 working within the said cylinder or housing.

The swing of the lamps 13 can be varied by changing the position of the clamps 18 on the rod 11 as should be obvious.

What is claimed is:—

The combination with a headlight for a motor vehicle, of a mounting in the form of a vertically disposed tubular post carried by the vehicle, a stem on the headlight and rotatably engaged in the mounting, means on the stem for detachably retaining it in the mounting, an eye member made fast to the stem, a hinged jaw clamp carried by a cross tie rod of turn knuckles of the vehicle, means on the tie rod and at opposite sides of the clamp to hold the same in adjusted position, a two-part piston cylinder, a headed pin rotatably engaged in the cylinder, a retaining pin detachably securing the headed pin with said clamp and a rod pivoted to the eye member and having a piston end fitted in said cylinder.

FELIX B. MILLINGTON.